(12) United States Patent
Heintel et al.

(10) Patent No.: US 8,078,811 B2
(45) Date of Patent: Dec. 13, 2011

(54) METHOD FOR DIGITAL STORAGE OF DATA ON A DATA MEMORY WITH LIMITED AVAILABLE STORAGE SPACE

(75) Inventors: Markus Heintel, Munich (DE); Christian Hiob, Eglharting (DE)

(73) Assignee: Siemens IT Solutions And Services GmbH, Munich (DE)

(*) Notice: Subject to any disclaimer, the term of this patent is extended or adjusted under 35 U.S.C. 154(b) by 516 days.

(21) Appl. No.: 12/057,485

(22) Filed: Mar. 28, 2008

(65) Prior Publication Data

US 2008/0244201 A1  Oct. 2, 2008

Related U.S. Application Data

(60) Provisional application No. 60/921,097, filed on Mar. 30, 2007.

(30) Foreign Application Priority Data

Mar. 30, 2007 (DE) .................. 10 2007 015 535

(51) Int. Cl.
*G06F 12/02* (2006.01)
*G06F 12/00* (2006.01)

(52) U.S. Cl. ............... 711/158; 711/172; 711/E12.001; 711/E12.002; 707/E17.01

(58) Field of Classification Search ............ 711/158, 711/172, E12.001, E12.002; 707/E17.01
See application file for complete search history.

(56) References Cited

U.S. PATENT DOCUMENTS

| 7,043,506 | B1 | 5/2006 | Horvitz | |
|---|---|---|---|---|
| 2003/0014603 | A1* | 1/2003 | Sasaki et al. | 711/158 |
| 2007/0033330 | A1 | 2/2007 | Sinclair et al. | |
| 2008/0049276 | A1* | 2/2008 | Abe | 358/524 |

* cited by examiner

*Primary Examiner* — Mardochee Chery
(74) *Attorney, Agent, or Firm* — Schiff Hardin LLP

(57) ABSTRACT

The most important data in a first memory of a data processing system are stored in a limited second data memory given upon a transfer thereof. The demarcation between important (and still storable) data on the one hand and less important (and therefore no longer storable) data is made dependent on the available storage volume (SV) of the target data memory. This achieves that an optimal amount of the most important data can be stored on the target data memory.

3 Claims, 2 Drawing Sheets

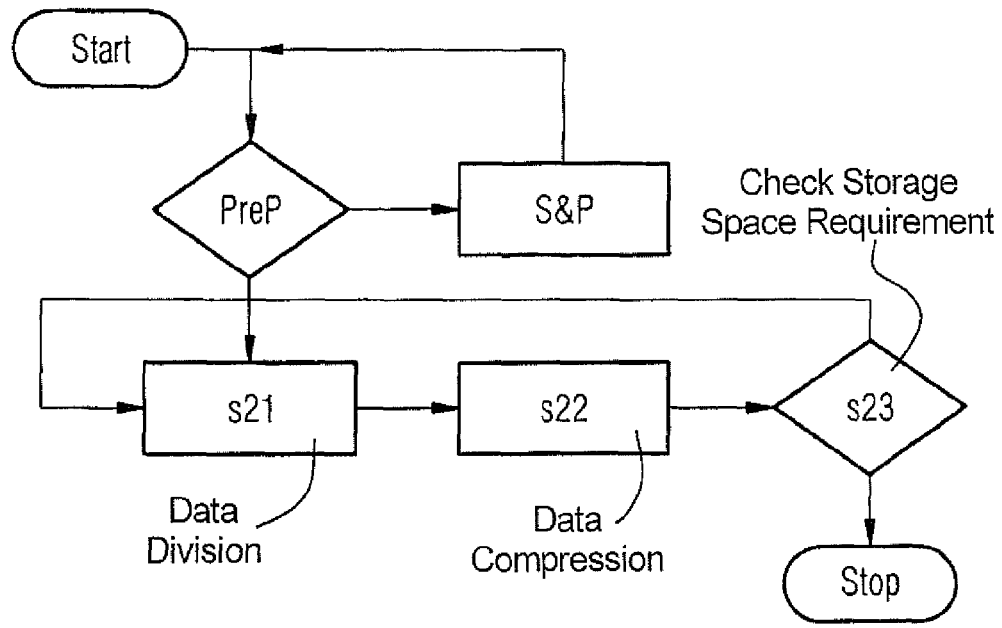
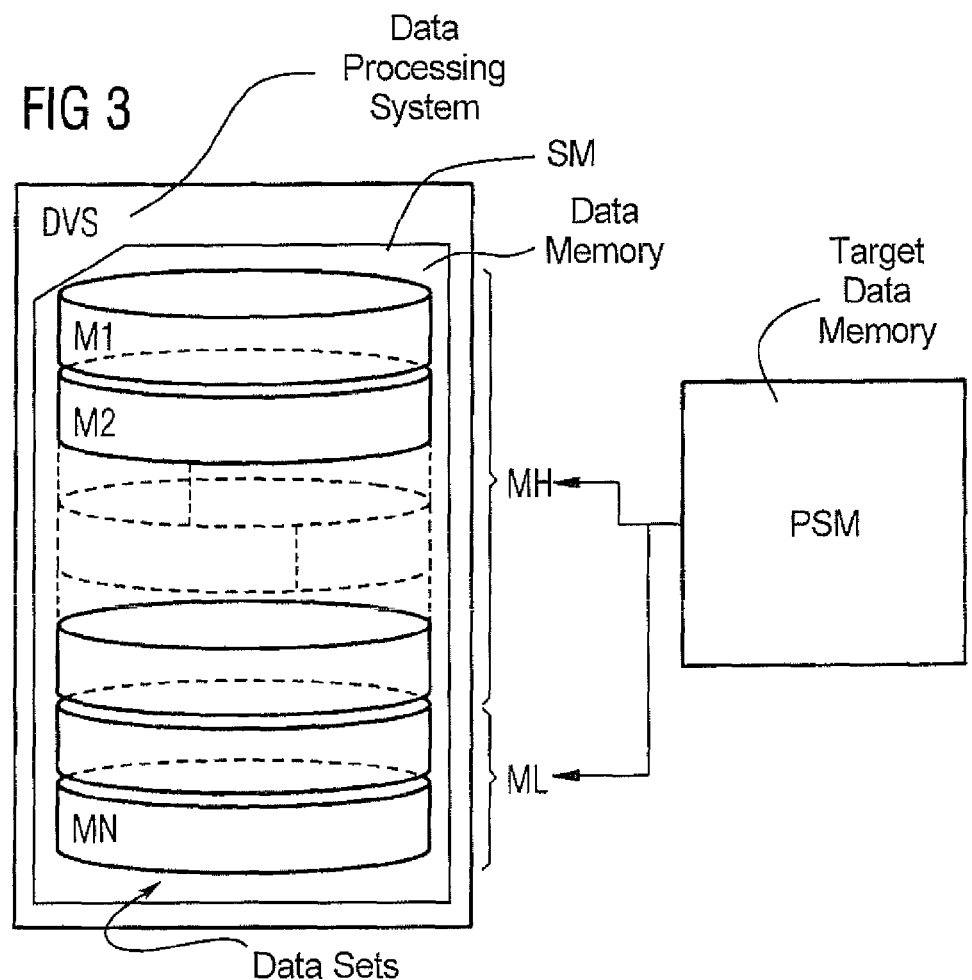

METHOD FOR DIGITAL STORAGE OF DATA ON A DATA MEMORY WITH LIMITED AVAILABLE STORAGE SPACE

RELATED APPLICATION

The present application claims the benefit of the filing date of U.S. provisional application 60/921,097 filed Mar. 30, 2007.

BACKGROUND OF THE INVENTION

1. Field of the Invention

The present invention concerns a method for digital storage of data in at least one data memory of a data processing system in a second data memory with limited available storage space.

2. Description of the Prior Art

Although the size of the available storage volumes of modern data memories continues to increase further due to the rapidly progressing technical development of storage media technologies, the limitation of the available storage space in many applications of information technology remains a challenge for the developers of methods and applications of information technology. This is due to the steadily increasing data flood, i.e. in the steadily increasing size of the files in modern applications (multimedia, medical technology etc.), which is often caused by the likewise increasing processor power or improved acquisition methods with higher resolution. Moreover, the importance of portable storage media is increasing, the storage volume of which is primarily limited by requirements of size, weight and production costs.

Important examples are memory cards and chip cards (with or without their own processors) that today are used in multimedia applications or, for example, in a similar form in medical telematics in the form of patient cards ("electronic health insurance cards"). The storage volumes of such storage media are limited and normally cannot be subsequently expanded due to their portability or for cost reasons. Precisely in applications in medical telematics should be expected that a large amount of data (patient data, findings, prescriptions, image data etc.), the total volume of which could quickly exceed the available storage volume, will be stored on such portable storage media in the future.

SUMMARY OF THE INVENTION

An object the present invention is to improve the possibilities for information technology to address the above problems.

The above object is achieved in accordance with the present invention by a method for digital storage of data, that are present in at least one first data memory of a data processing system, upon transfer of the data to a second data memory with limited available storage space, wherein the second data memory is connected with the data processing system via a data interface and wherein the data set to be stored therein is composed of N data subsets, or is divided into N data subsets, and wherein at least some of the N data subsets are organized according to a priority assigned respectively to the subsets. In accordance with the invention, a computerized search is made during which the data in the first memory, to be transferred to and stored in the second memory, are divided into a first division set and a second division set according to the search criteria that the priority of no data subset in the first division set is less than the priority of any data subset in the second division set. The computerized search is implemented in multiple steps for iterations, with the respective first and second division sets accumulating as the result of each successive step or iteration. In each step of iteration of the computerized search, a check is made as to the storage space requirement for the accumulating first division set, and a largest number Z of data subsets is determined that can be stored in the available storage space of the second data memory for which the criterion applies that the priority of no data subset that is storable in the available in storage space is less than the priority of any data subset that can no longer be stored in the available storage space. The Z data subsets that are determined in this manner are then transferred to the second data memory and are stored therein.

BRIEF DESCRIPTION OF THE DRAWINGS

FIG. 2 is a flowchart of an embodiment of the inventive method.

FIG. 3 schematically illustrates the division of a data set into data subsets for transfer to and storage in the target (second) data memory in accordance with the present invention.

DESCRIPTION OF THE PREFERRED EMBODIMENTS

Figure 1:
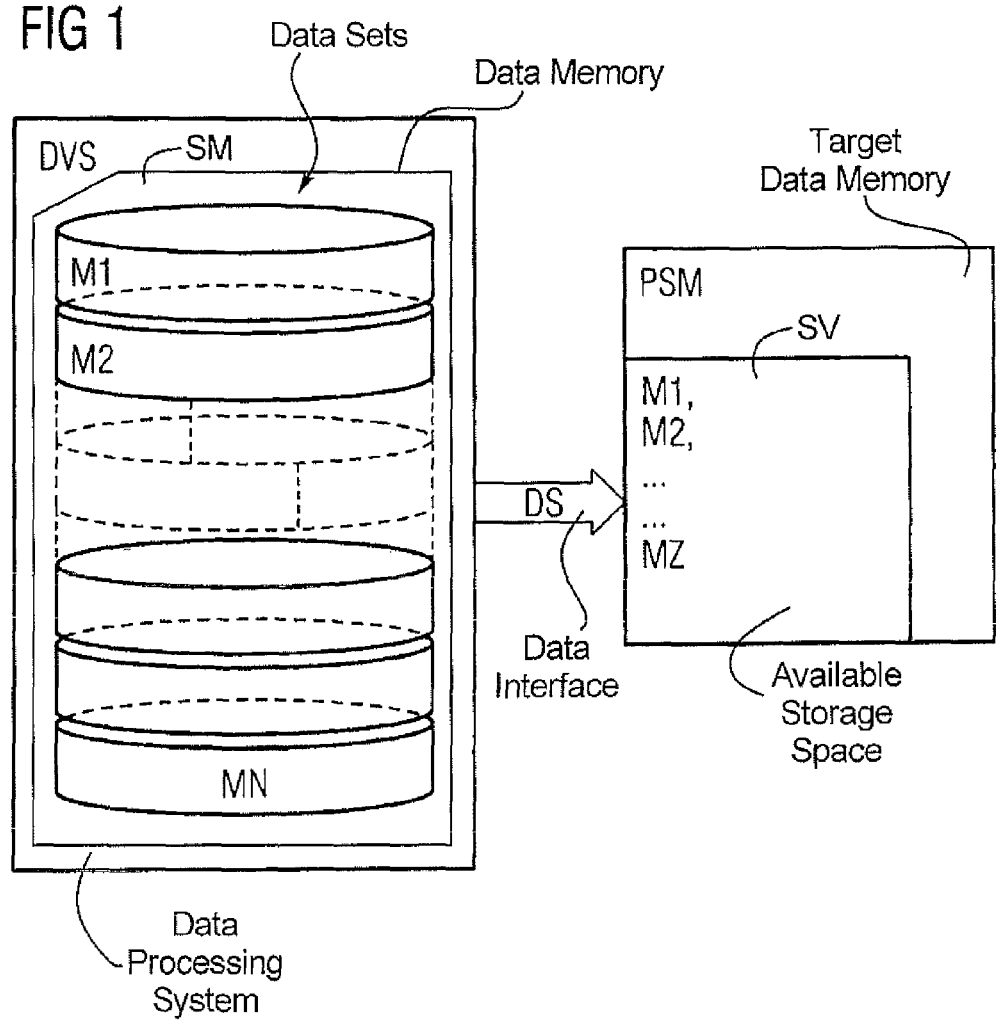
FIG. 1 schematically illustrates the arrangement and transfer of data subsets in a data processing system for explaining the inventive method.

As illustrated in FIG. 1, the inventive method is based on the insight that in many application cases the quantity of the data (dat) to be stored can divided into sub-data sets (M1, ..., MN) or is already divided based on the application, and that in many cases the data in the sub-data sets differ in their importance or relevance for the respective application or for the respective user. In accordance with the invention, the most important of these data are stored and the demarcation between important (and still storable) data and less important (and therefore no longer storable) data is made dependent on the available storage volume (SV) of the target data memory (PSM). This results in an optimal amount of the most important data being stored on the target data memory (PSM).

The criteria for assessment of the importance (and that the methods for prioritization of the subsets) are determined by the respective application. This is easily seen in the aforementioned example of the patient card when it is assumed, for example, that following a series of examinations in a hospital the findings (for example audiograms, EKG signal etc.), laboratory results (blood analyses of various dates), digital x-ray images, physicians reports, prescriptions, etc. should be stored on such a card upon discharge of the patient in addition to the personal data of a patient (such as, for example, name, insurance number etc.). It may make sense that the storage of more recent examination results will be more important that that of older results from the viewpoint of the treating physician, or that an electronic prescription can in some cases be more important than the storage of EKG signal. In the specific application case the treating physician will want to make this decision individually, though, and determine this in his or her application software with the aid of a corresponding menu, for example.

For example, (natural or rational) numerical values could be assigned to the data sets, files or (general) sub-data sets of the set of data to be stored, such that an organization or at least semi-organization of the subsets to be stored would be induced via the organizational relationship of the natural or rational numbers. In the semi-organization there will be subsets with identical priority and therefore with the same numerical value. Such numerical values could be assigned by the treating physician, but also automatically by the data processing system of the application using specific guidelines.

Another possibility would be that the treating physician interactively or manually arranges the sub-data sets (data sets, files etc.) in an order with the aid of a correspondingly designed user interface of his application software, in that he shifts the individual list objects (for example with the mouse) in a list of the subsets to be organized that is displayed to him on a screen, or actuates a button after marking a list object, which actuation shifts the list object "up" or "down" in the list. Using this description it is clear that many similar embodiment possibilities arise.

A separation of a data set or of a file into sub-data sets or files can also be effected in a similar manner, for example when a file contains a number of x-ray exposures or when a file include a blood analysis with data sets regarding various blood values of different relevance for the application case. Depending on the file structure of the data to be separated, a text editor or a special menu of the employed application software that possibly has an integrated image displayer ("image viewer", "previewer" for items known as "thumbnails", "icons" etc.) can be used for this, for example. FIG. 1 shows the data processing system DVS with the sub-data sets $M1, \ldots, MN$ present in it in a schematic manner.

If the set M of the data to be stored exists at the start in the form of an organized or at least semi-organized set of sub-data sets ($M1, \ldots, MN$), then a search is initiated to determine the greatest possible number Z of subsets ($M1, \ldots, MZ$) that can be stored on the available storage space (SV) of the second data memory (PSM). The search is executed by a processor P of the data processing system DVS and in the course of which the set (M) of data (dat) to be stored is divided into a first set (MH) and second set (ML) in each search step, for which it applies that the priority of no sub-data set (Mk) in the first set (MH) is smaller than the priority of an arbitrary sub-data set (Mj) in the second set (ML).

An exemplary embodiment of this search is schematically presented in FIG. 2. The actual search method occurs after execution of the preprocessing (PreP, S&P) in which the sub-data sets are generated (if necessary) via subdivision of the set M of data to be stored and are subsequently (if necessary) organized according to their priority. Not only the actual search but also the pre-processing is executed as a program loop in the example shown in FIG. 2. In the pre-processing it is checked at the beginning (Start) and after each preprocessing step (S&P) whether the preprocessing has ended because the data set (M) to be stored (already) exists in the form of an organized or at least semi-organized set of sub-data sets ($M1, \ldots, MN$). The processing steps (S&P) thereby include the sub-division (separation) and the organization (prioritization).

The preprocessing is followed by the actual search, which in turn has the form of a program loop that comprises at least the program steps
the separation (s21) of the set M into the first set MH and the second set ML and
the checking (s23) of the storage space requirement (VMH) of the first set MH.

In some embodiments of the invention further steps (s22) such as, for example, a data compression can be added. If the largest possible set MH is found, the search loop is abandoned (STOP).

The result of such division and searching is schematically illustrated in FIG. 3.

During the search, whether the respective storage space requirement (VMH) of the respective first set (MH) is smaller than or equal to the available storage space (SV) of the target data memory (PSM) is thus determined by checking the storage space requirement (VMH) of the first set (MH), implemented at each step. The largest possible first set (MH) for which this condition is satisfied is determined as a result of the search. Since all of these first sets (MH) include a number of sub-data sets ($M1, \ldots, MT$), the maximum Z of all numbers T thereby occurring is thus determined as a result of the search.

Consequently, the object of determining the greatest possible number Z of subsets ($M1, \ldots, MZ$) that can be stored on the available storage space (SV) of the second data memory (PSM) is achieved by the search. Since the set M existed in the form of an organized or at least semi-organized set of sub-data sets ($M1, \ldots, MN$), these Z sub-data sets ($M1, \ldots, MZ$) so determined are the "most important" sub-data sets in the sense that the priority of no sub-data set that can be stored in this manner is less than the priority of an arbitrary sub-data set that can no longer be stored in this manner.

In an embodiment of the inventive method it is provided that at least one part of the data in the respective first set (MH) is compressed with the aid of a data compression method in each step of the search before the respective check of the storage space requirement, such that the storage space requirement of the respective compressed data is checked, and in which the Z sub-data sets ($M1, \ldots, MZ$) determined in this manner are finally transferred in a compressed form to the second data memory and are stored thus on this.

Although, depending on the data compression method used and dependent on the type of the data that are compressed and dependent on the intended degree of compression, this measure is connected with a more or less significant speed loss of the inventive method, it is in many cases made up for by the increase of the thereby achievable number N of the sub-data sets that can be stored on the target data medium. It is taken into account that in many applications (such as, for example, in the archiving of multimedia data or in the storage of patient data and examination data on patient cards) the time required for this is not of primary importance.

The data compression method employed can be (however does not have to be) the same compression method for each sub-data set in the respective first set MH. When the first set MH considered in a search step includes, for example, both text data and image data, advantages are achieved when an image data compression method (for example JPEG, MPEG etc.) specially developed for this is used for the compression of the image data. Whether the text data are compressed at all can be made dependent on their degree of redundancy.

Some text data (such as, for example, blood analysis protocols) that contain many abbreviations and only a few natural language terms can frequently not be compressed with a significant compression factor. Other text data such as, for example, physicians reports normally comprise significant redundancies that can be easily eliminated using standard compression methods developed for these (for example Huffman, LZW etc.). The relevant literature provides the competent reader of this specification numerous possibilities for optimization.

Instead of treating individual sub-data sets in the first set MH with different respectively adapted compression methods due to their different redundancy structures, however, it is also possible to subject the respective first set MH of a respective search step in its entirety to a data compression method ("as a block"). This is particularly suited for a signal when the redundancy structures are not very different or when the speed gains connected with this should not be disregarded.

The search for the optimal first set MH for which the storage space requirement (VMH) or the compressed storage space requirement (VMH) (depending on whether and possibly how compression methods are used) is smaller than or equal to the available storage space (SV) in the target data storage (PSM) does not necessarily have to lead to a real optimum in every embodiment of the invention. Particularly in those cases in which the additional gain in information to be stored is just too small after a few search steps can it be reasonable to abort the search after finding a nearly optimal first set MH and to view the number Z of the sub-data sets in this nearly optimal first set MH as the greatest possible number Z that can be stored on the available storage space (SV) of the second data memory.

Very generally, every binary search method is suitable for searching for an optimal or sub-optimal first set MH. Such methods are described in detail in, for example, the monograph by Donald E. Knuth, "The Art of Computer Programming", Volume 3, 2nd Edition, Addison Wesley, 1997 (here in particular in section 6.2.1) and are thoroughly familiar to the average man skilled in the art. The individual binary search methods differ primarily in their underlying division rules with the aid of which the set M is subdivided into a first set MH and a second set ML in each search step.

The simplest division rule can also be designated as a semi-division in which the set M is divided into two (approximately) equally large parts in a first step. If the storage space requirement VMH of the (possibly compressed, partially compressed or uncompressed) first set MH is greater than the available storage space SV of the second data memory, the sought first set MH must then be smaller than the first set MH examined in this step. In this case the set MH is for its part sub-divided into two (approximately) equally large parts MH' or, respectively, ML' in a next step of the search.

If VMH is equal to SV, the search is ended and the number Z of the sub-data sets in MH is the sought number of the storable sub-data sets.

If VMH is smaller than SV then a set MH" could still be provided in which a larger number Z" of sub-data sets is contained than in MH. In this case the set ML is subdivided into two (nearly) equally large sets MLH or, respectively, MLL in a next step of the search and the new first set MH" to be checked is the set union of MH and MLH. The new second set ML" would then be the set MLL.

The search is interrupted (STOP) when the largest possible set MH was found or when a further search no longer promises practical, significant increase of this set.

Instead of the (approximately) halving, other division rules can be advantageous in some cases. For example, if the data volumes (dV1, ..., dVN) of the sub-data sets (M1, ..., MN) are known before or after a data compression, this knowledge can be advantageously used to accelerate the search, for example in that an extrapolation of the expected storage space requirement is effected in the division using the known data volumes (dV1, ..., dVN) of the sub-data sets (M1, ..., MN). If all data volumes (dV1, ..., dVN) are approximately equal in size, the number of the sub-data sets in the respective sets MH or, respectively, ML can then also be used to control the division. Using the present specification and using his general expertise, the average person skilled in the art can easily find further variants that cannot all be described here for space reasons.

In many cases the sub-data sets (M1, ..., MN) will not be strictly organized based on their priority but rather will be subjected only to a semi-organization. This will in particular occur when the priorities of some sub-data sets are the same and the semi-organization hereby induced is not replaced by, for example, a manual (possibly arbitrary) organization of the sub-data sets by the treating physician. A possibility to solve this problem then exists in establishing the order of sub-data sets with identical priority so that optimally many sub-data sets (M1, ..., MZ) can be transferred to the second data memory and be stored therein.

For this an adaptive reestablishment of initially identical priorities would be required during the search. The average person skilled in the art can easily integrate these into the search using the descriptions present here, for example into the search step s22 of FIG. 2. For example, a randomly-controlled method or a method based on the knowledge of the data volumes (dV1, ..., dVN) of the sub-data sets (M1, ..., MN) can thereby be used for program-controlled reestablishment of initially identical priorities.

The individual sub-data sets do not all have to be stored on the same first data memory (SM) of a single data processing system DVS. In some application cases individual sub-data sets or groups of such can exist on different first memories (SM) of a data processing system DVS or a number of data processing systems DVS that, under the circumstances, are spatially separated from one another and are connected with one another via a remote connection (such as, for example, the Internet). In other cases, however, the sub-data sets can arise via division of a large file (for example an image file) and therefore be stored on the same first data memory (SM).

Although modifications and changes may be suggested by those skilled in the art, it is the intention of the inventors to embody within the patent warranted hereon all changes and modifications as reasonably and properly come within the scope of their contribution to the art.

We claim as our invention:

1. A method for storage of digital data, that are present in a first data memory of a data processing system, in a second data memory with limited available storage space, comprising the steps of:

establishing a division of said data in said first data memory into N data subsets;

organizing at least some of said N data subsets according to associated hierarchical priorities respectively associated with said at least some of said N data subsets;

executing a computerized search of said data in said first data memory in multiple steps to divide said at least some of said N data subsets into a first division set and a second division set according to a search criteria requiring that a priority, among said hierarchical priorities, of no data subset in the first division set is lower than a priority, among said hierarchical priorities, of any data subset in the second division set;

in each step of said computerized search, compressing data in said first division set to produce compressed data and thereafter checking a storage space requirement of the compressed data of the first division set;

from said check, automatically determining a largest number Z of said data subsets that can be stored in the available storage space according to a determination criterion that a priority, among said hierarchical priorities, of no data subset that can be stored in the available storage space is less than a priority, among said hierarchical priorities, of any data subset that can no longer be stored in the available storage space, N and Z being integers; and transferring the compressed data of said Z data subsets from said first data memory to said second data memory via a data interface between the first data memory and the second data memory.

2. A method as claimed in claim 1 comprising conducting said computerized search as a binary search according to a division rule based on respective data volumes of the data subsets.

3. A method as claimed in claim 1 comprising, for any of said N data subsets that are not organized based on priority assigning each of those subsets an identical priority and including said data subsets with said identical priority in the determination of said Z data subsets.

* * * * *